United States Patent [19]

Ebihara et al.

[11] 4,217,654

[45] Aug. 12, 1980

[54] PORTABLE ELECTRONIC DEVICE EQUIPPED WITH TIMEKEEPING AND CALCULATION FUNCTIONS

[75] Inventors: Heihachiro Ebihara; Fukuo Sekiya, both of Tokorozawa; Takashi Yamada, Sayama, all of Japan

[73] Assignee: Citizen Watch Company Limited, Tokyo, Japan

[21] Appl. No.: 928,077

[22] Filed: Jul. 26, 1978

[30] Foreign Application Priority Data

Jul. 26, 1977 [JP] Japan .................................. 52-89668

[51] Int. Cl.$^2$ ......................... G06F 7/48; G06F 15/02; G04B 19/30

[52] U.S. Cl. ...................................................... 364/705

[58] Field of Search ............ 364/705; 58/50 R, 152 R

[56] References Cited

U.S. PATENT DOCUMENTS

| | | | |
|---|---|---|---|
| 3,788,058 | 1/1974 | Idei et al. | 58/50 R X |
| 3,813,533 | 5/1974 | Cone et al. | 364/705 |
| 3,816,730 | 6/1974 | Yamamoto et al. | 58/50 R X |
| 4,093,992 | 6/1978 | Kawamura et al. | 364/705 |

*Primary Examiner*—Jerry Smith

*Attorney, Agent, or Firm*—Holman & Stern

[57] ABSTRACT

A portable electronic device equipped with timekeeping and calculation functions, time and calculation data being stored in semistatic shift registers. Time data is circulated once per second through a loop containing two full adders with units of seconds being incremented by one in each circulation by the first adder and digit carry operations performed by the second adder and by a bit set/reset circuit during the same circulation. Units of seconds digit of displayed time data corresponds directly to least significant digit of stored time information.

4 Claims, 9 Drawing Figures

PORTABLE ELECTRONIC DEVICE EQUIPPED WITH TIMEKEEPING AND CALCULATION FUNCTIONS

This invention relates to portable electronic devices which incorporate both timekeeping and calculation functions, and have a display to indicate time information or calculation information in digital form. Such devices include, for example, digital electronic wristwatches which incorporate a calculation keyboard and calculation functions.

In the case of conventional designs of such devices, the same circuit elements are normally used to perform calculations when the device is in a calculation mode and for updating of time information on a continuous basis. Usually, also, the same circuit elements are used for serial to parallel conversion of both time and calculation data, for display purposes. For these reasons, the registers which store the time information and calculation information usually have the same length. Since 8 digits are normally utilized for calculation purposes, this results in some of the digits in the timekeeping register being non-significant for time display purposes. The information in the timekeeping and calculation registers is normally circulated in alternate cycles of fixed length. If a calculation is in progress when a timekeeping cycle begins, then the calculation processing is temporarily interrupted. With such a system it is difficult to achieve a high speed of calculation, and the power consumption is relatively high since a large number of bits of data must be shifted frequently for timekeeping purposes.

With a device in accordance with the present invention, the least significant digit of time information held in the timekeeping register, which corresponds to the units of seconds of time information, corresponds directly to the units of seconds digit position on the display. The timekeeping register contents are updated once per second by having one added to the least significant digit, in the timekeeping mode. If the device is set to the calculation mode, then updating of the seconds of time information is delayed until the end of the calculation operation, if necessary. Since the maximum duration of a calculation operation is appreciably less than one second, this feature has no deleterious effect upon the timekeeping accuracy.

It is therefore an object of the present invention to provide a portable electronic device incorporating both a timekeeping function and a calculation function in which the least significant digit of time information held in a timekeeping register corresponds directly to the least significant digit of time information displayed on a display unit, and in which the contents of said timekeeping register are incremented once per second.

A further understanding of this and other objects, features and advantages of the present invention will be apparent from the following description of the attached drawings, whose scope shall be provided by the appended claims.

Figure 1:
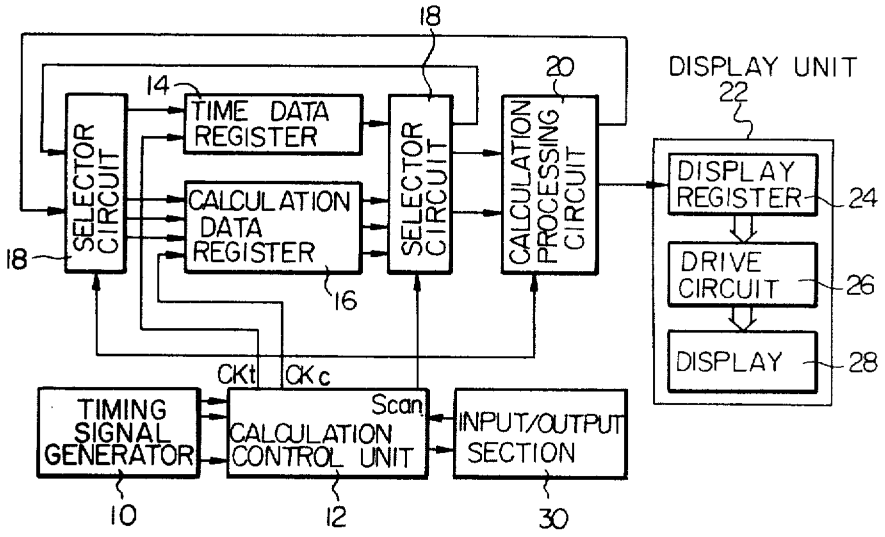
Fig. 1 (PRIOR ART)
FIG. 1 is a block diagram showing the configuration of a portable electronic device having timekeeping and calculation functions of conventional design.

Referring now to FIG. 1, a block diagram is shown therein of a conventional type of device having both timekeeping and calculation functions. Standard frequency timing signals are produced by a timing signal generator 10, which are applied to a calculation control unit 12. This unit produces shift pulses CKt and CKc which are applied to a time data shift register 14 and a calculation data register 16. The operation of the calculation control unit 12 can be controlled by the user through actuation of external control members coupled to an input/output unit 30. The circulation of data from shift registers 14 and 16 is controlled by means of data selector circuits 18, which are controlled by calculation control unit 12. Calculation operations are performed under the control of calculation processing unit 20. Timekeeping data or calculation data (depending upon whether the calculation mode or timekeeping mode has been selected) are passed to display unit 22. Display unit 22 consists of a display register 24, for converting serial input data into parallel form, drive circuit 26 which produces display drive signals in accordance with the outputs from display register 24, and a display 28.

Figure 2:
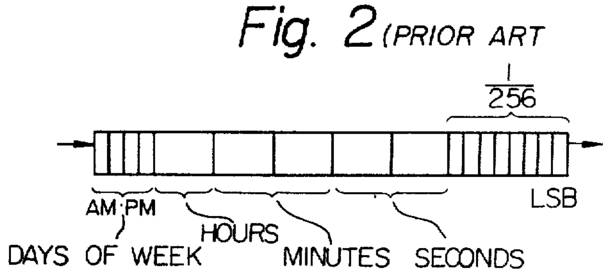
Fig. 2 (PRIOR ART
FIG. 2 is a diagram showing the contents of the timekeeping register shown in FIG. 1.

Referring now to FIG. 2, the contents of a time data register 14 are shown for the case in which days of the week, hours, minutes and seconds data are stored. It is assumed that the display has 8 digits, for reasons of calculation precision. Time data register 14 therefore also stores 8 digits of information. Each decimal digit is stored in binary coded decimal form, i.e. as a series of 4 bits. The upper 6 digits of the time data register contain the time information which is actually displayed. The lower two digits contain time information which is not displayed. The least significant bit of the time data register contents has a weight of 1/256 seconds.

Figure 3:
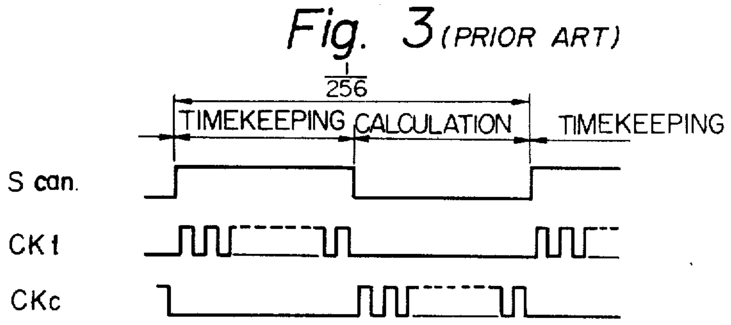
Fig. 3 (PRIOR ART)
FIG. 3 is a waveform diagram illustrating the circulation of data in the timekeeping and calculation registers shown in FIG. 1.

FIG. 3 illustrates the waveforms of signals controlling the operation of the circuit shown in FIG. 1. The Scan signal is of symmetrical square waveform, and defines alternate timekeeping and calculation cycles. During a timekeeping cycle, the time information held in time data register 14 is shifted by means of shift clock signal CKt and is passed through calculation processing unit 20 and back into time data register 14, by data selector circuits 18 being opened at appropriate timings. During each of these data circulation cycles, the least significant bit of the time data is incremented by one, by means of an adder circuit in calculation processing unit 20. Since the Scan signal has a period of 1/256 seconds, and the least significant bit of the time data has a weight of 1/256 seconds, it will be apparent that timekeeping is achieved by means of these data circulations. When a timekeeping data circulation cycle has been completed, a calculation data circulation cycle begins, if the device has been set in the calculation mode. Calculation data then circulates from calculation data register 16 through calculation processing unit 20 and back into calculation data register 16, in response to shift clock pulses CKc, with data selection circuits 18 being opened at appropriate timings. It can be seen that since a calculation must consist of a series of such data circulations, and since each calculation data circulation is separated from the next one by a time data circulation cycle, a substantial amount of time is required to perform a calculation. Such a system also has the disadvantage that 32 bits of time data must be shifted in each timekeeping cycle, i.e. every 1/256 seconds. The level of power consumption is therefore relatively high. If an attempt is made to increase the calculation speed by increasing the frequency of the shift clock pulses applied to the calculation data registers, this will also result in increased power consumption, for such reasons as increased power dissipation in the oscillator circuit and the increased number of circuit elements which are required.

Figure 4:
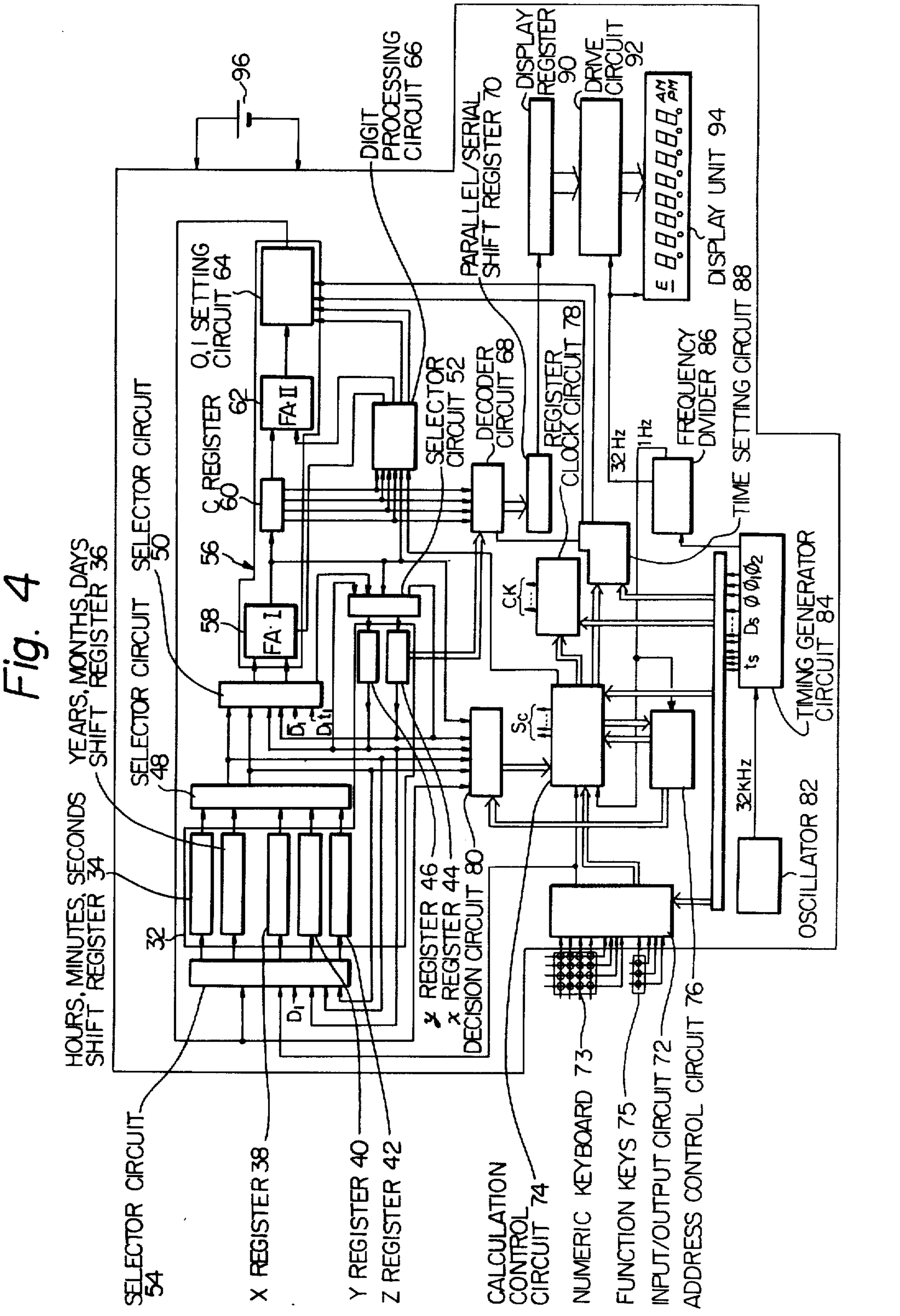
FIG. 4 is a general block diagram of an embodiment of a device having timekeeping and calculation functions in accordance with the present invention.

Referring now to FIG. 4, an embodiment of a device having both timekeeping and calculation functions in accordance with the present invention is shown in block diagram form. Numeral 32 indicates a time data shift register and calculation shift register section. This contains two timekeeping shift registers 34 and 36. Shift register 34 serves to store the hours, minutes and seconds of current time data. Register 34 serves to store the year, months and day data. Registers 38, 40 and 42 are shift registers used for calculation data. These are designated as the X register, Y register and Z register, respectively. The X and Y registers are used to hold data which is input from the keyboard to be operated upon. The Z register is used to store the results of calculations.

Decimal point information in the calculation data is stored separately, in the x and y registers 44 and 46.

All of the shift registers listed above are of semi-static type, i.e. information held therein is normally held in a static manner, but can be moved into or out of the shift register at any desired time by means of a discrete group of shift clock pulses being applied.

Numerals 48, 50, 52 and 54 indicate data selector circuits, which are controlled by selector signals Sc, to be described later. Data stored in the shift registers described above can be selectively output or input by means of these data selectors.

Numeral 56 indicates a calculation circuit. This is mainly used to periodically increment the units of seconds time data stored in register 34 and to perform arithmetic operations upon data stored in the X and Y registers. Periodic updating of the time information is performed by adding one to the units of seconds data from shift register 34, by mean of a full circuit 58. Addition operations for calculations are performed by full adder 62. This adder is also used for decimal carry operations.

C register 60 provides successive digits of the contents of selected registers at four output terminals, and is connected between full adder 58 and full adder 62. 0,1 setting circuit 64 is used for correction of time information held in shift registers 34 and 36. This correction is performed by the user, through actuation of appropriate keyboard keys. 0,1 setting circuit 64 is also used in some calculation operations, when a carry operation is performed. By applying suitable control signals to the 0,1 setting circuit 64, any desired bits of data, sent from a register, can be set to the logic 1 level or reset to the logic 0 level, as required.

Binary coded decimal information output from C register 60 is applied to decoder circuit 68, where it is converted into 7-segment display signal form, one digit at a time, as register data is circulated through C register 60. Decimal point data is also applied from x register 44 to decoder circuit 68 and decoded therein. The decoded display segment information is output in parallel form, and is input to a parallel/serial conversion shift register 70. The display segment information is output in serial form from shift register 70, and is input to display register 90. The display segment information is then output in parallel from display register 90 and applied to display drive circuit 92. This circuit generates display segment drive signals, which are applied to display unit 94.

Numeral 72 indicates an input/output circuit, which operates numeric data signals and calculation instructions, etc, in response to actuation of appropriate keys on a keyboard 73. Output signals from input/output circuit 72 are applied to calculation control circuit 74. Calculation control circuit 74 generates selector circuit control signals Sc, register shift control signals which control the shift clock signals applied to the various registers, address control signals, numeric value setting control signals, and digit processing control signals.

Address control circuit 76 serves to perform setting, advance and resetting of addresses, in accordance with address control signals generated by calculation control circuit 74.

Numeral 78 indicates a register clock signal generation circuit. This circuit produces groups of shift clock pulses which are applied to the time information and calculation data shift registers as well as to C register 60, display register 90 and parallel/serial conversion shift register 70. The timings at which shift clock pulses are produce by register clock circuit 78 are controlled by signals applied from calculation control circuit 74.

Numeral 80 indicates a decision circuit, which performs logical decisions relating to the contents of the various shift registers while the register contents are being circulated in time serial form. The results of these decisions are applied in the form of control signals to calculation control circuit 74, in order to control the execution of calculations, by means of signals generated by calculation control circuit 74.

Numeral 82 indicates an oscillator circuit, which generates a standard frequency signal at 32 KHz, in the embodiment of the present invention being described herein. This signal is applied to a timing signal generator 84 which generates various timing signals based on the 32 KHz standard frequency signal. An output from timing signal generator 84 is applied to frequency divider circuit 86, which produces output signals with frequencies of 32 Hz and 1 Hz.

Numeral 88 indicates a time setting control circuit. This is used to perform correction and setting of time information held in shift registers 34 and 36. When a time setting operation is specified, by actuation of an external control member coupled to a switch, described later, then actuation of digit keys on keyboard 73 causes time setting information to be input to time setting control circuit 88 from calculation control circuit 74. As a result, time setting control circuit 88 produces signal which are applied to 0,1 setting circuit 64 at appropriate timings for setting or resetting of the data bits of the time information to be corrected, as this information is circulated through 1, 0 setting circuit 64. In other words, by actuating appropriate keys, any part of the time information contained in registers 34 and 36 can be modified by setting corresponding bits of that information to the 1 or 0 logic level as it is circulating through 0,1 setting circuit 64.

Figure 5:
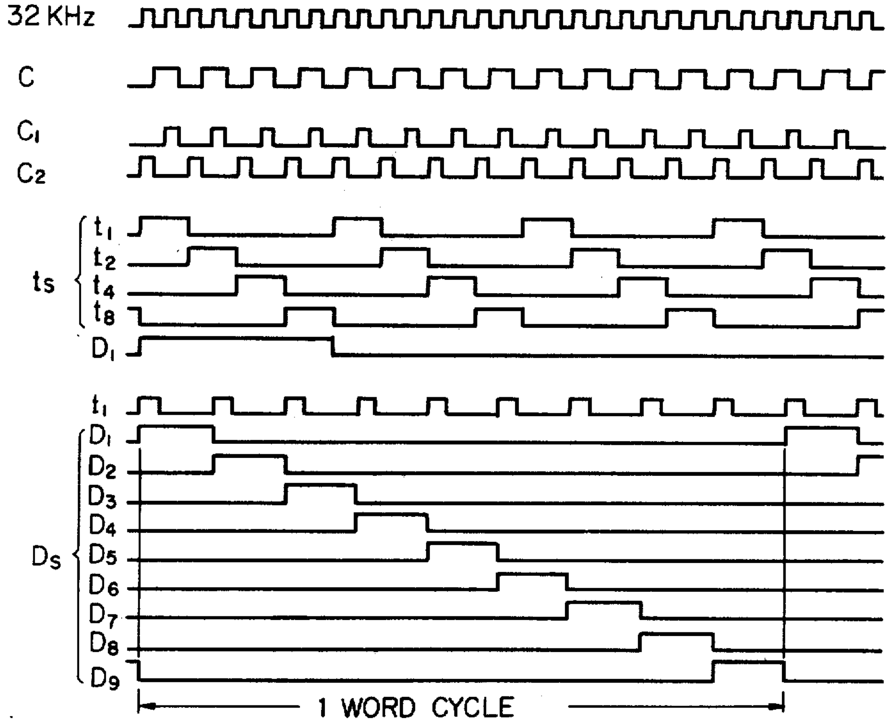
FIG. 5 is a waveform diagram showing various timing and control signals used in the circuit shown in FIG. 4.

FIG. 5 shows the waveforms of the 32 KHz signal from oscillator 82 and the various timing signals produced by timing signal generator 84. Signal C has a frequency of ½ the 32 KHz standard frequency signal. This is used to produce shift clock signals C1 and C2, which serve to transfer data in serial form through the various shift registers. C1 and C2 differ in phase by an amount equal to ½ the period of signal C. Signals t1, t2, t4 and t8 rise and fall on the leading edges of consecutive C2 pulses. A series of one each of pulses t1, t2, t4 and t8 is generated, then another identical series is generated, and so on, as shown in FIG. 5. These signals are used to produce binary coded decimal data in time serial form. They are collectively designated as bit signals $t_S$.

Each of signals D1 to D9 rises and falls on the leading edge of two successive t1 pulses. A series of one each of pulses D1 to D9 is generated, then another series is generated, and so on, as shown in FIG. 5. Signals D1 to D9 are collectively designated as digit signals $D_S$. Each of these digit signals corresponds to a digit of information held in the registers in binary coded decimal form, and created by means of four bit signals t1 to t8. The interval from the leading edge of digit signal D1 to the leading edge of the next D1 signal is called a word cycle.

Figure 6:
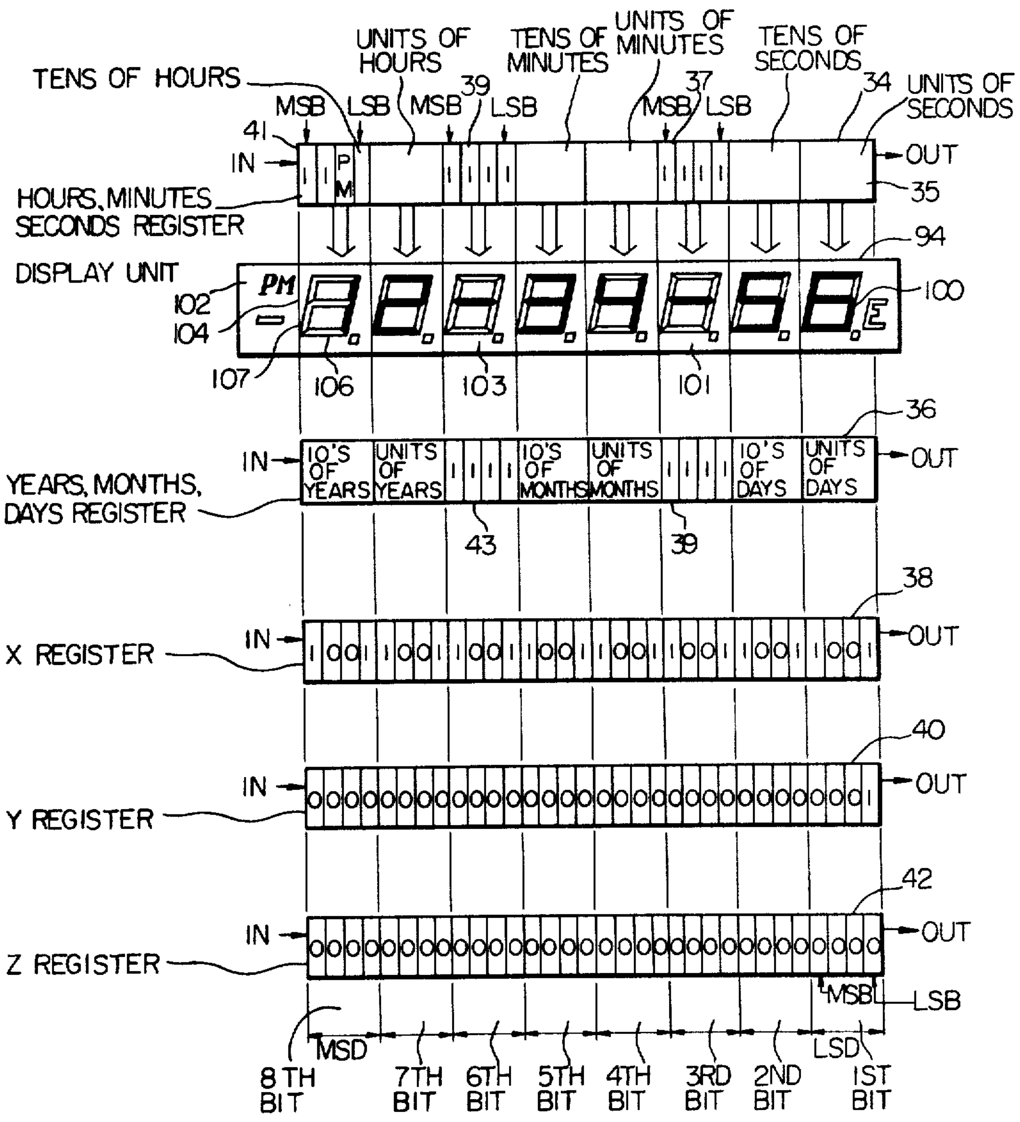
FIG. 6 is a diagram illustrating the relationships between the contents of timekeeping and calculation registers and the display unit, for the embodiment of the present invention shown in FIG. 4.

Referring now to FIG. 6, the relationship between the contents of time data shift registers 34 and 36, calculation shift registers 38, 40 and 42, and the display digit elements of display unit 94 are shown therein. In this diagram, the hours, minutes and seconds time display mode is assumed, and the time information displayed is 12(H) 34(M) 56(S) PM.

Each of the register locations in the time data and calculation data shift registers 34, 36, 38–40 and 42 has a length of 4 binary bits, in order to store a decimal digit in binary coded decimal form. It can be seen that the least significant digit 35 of hours, minutes, seconds shift register 34 corresponds directly to the least significant digit 100 of display unit 94, i.e. to the units of seconds display digit element. The tens of seconds location of shift register 34 similarly corresponds to the tens of seconds display digit element. The third least significant register location of shift register 34 is permanently filled with 1 level bits. This location corresponds to the third least significant display digit element 101. In the hours, minutes, seconds display modes, the all 1's contents of shift register location 37 of shift register 34 causes a horizontal bar symbol to be displayed at display digit element 101. This serves to delimit the minutes and seconds data appearing on the display. Similarly, shift register location 39 is filled with all 1's, causing a horizontal bar symbol to appear on the display which delimits the hours information and minutes information when the device is in the hours, minutes, seconds display modes. The most significant shift register location 41 has the upper two bit positions permanently filled with 1's. Since the tens of hours information can only be either 1 or 0, this information can be stored as a single binary bit. This is the least significant bit of shift register location 41. The AM/PM information is also stored as a single bit, which is the second bit from the least significant bit position in shift register location 41. The AM/PM information can be displayed as shown by a separate pair of letter constituted by display elements positioned to the left of the most significant display digit. However, it is also possible to indicate AM/PM information by causing all or part of display digit element 106 to flash on and off or to remain static. This could be done for example by utilizing display segment 107, causing this segment to flash on and off or to be held extinguished depending upon whether the time is AM or PM.

Register locations 39 and 43 of years, months, days shift register 36 are also filled with all 1's. These cause horizontal bar symbols to appear at the corresponding display positions when the device is set to the years, months, and days timekeeping mode of operation, i.e. they serve to clearly delimit the year, month and date pairs of data digits respectively. Each of the register locations of X register 38, Y register 40 and Z register 42 corresponds to one of the display digit elements of display unit 94. In FIG. 6, X register 38 is shown as storing 99999999, Y register 40 is shown as storing 00000001, and Z register 42 is shown as storing 00000000.

Figure 7:
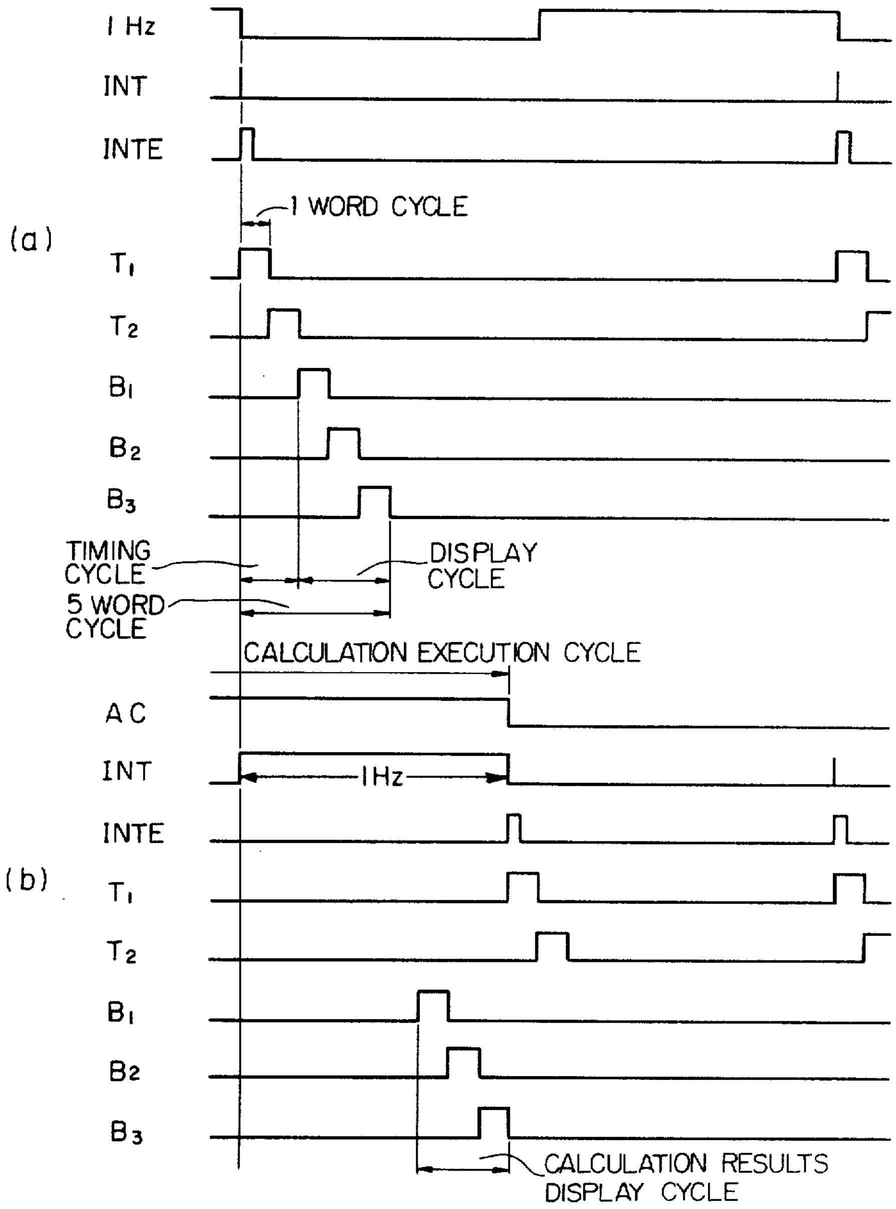
FIG. 7 (comprised of a and b) is a waveform diagram illustrating control signals which control the circulation of data in various registers in the timekeeping and calculation modes.

A general description of the operation of the embodiment of the present invention shown in FIG. 4 and FIG. 6 will now be given with reference to FIG. 4, FIG. 5, FIG. 6 and the waveform diagrams of FIG. 7. Referring first to FIG. 7, a 1 Hz square wave signal is shown which is generated by frequency divider circuit 86 shown in FIG. 4. When the device is in a timekeeping mode of operation, then the wave forms designated by (a) in FIG. 7 are applicable. In this case, a signal called INT is generated momentarily on the trailing edge of each 1 Hz signal pulse. A signal INTE, referred to as the interrupt enable signal, is generated as a pulse of fixed duration on the trailing edge of each INT pulse. On the leading edge of an INTE pulse, generation of a consecutive series of control signals T1, T2, B1, B2, and B3 begins, as shown in FIG. 7(*a*). During each of these control signal timings, the contents of the timekeeping registers are circulated through calculation circuit 56 during a 1 word cycle. During T1, the contents of hours, minutes, seconds register 34 are passed through selector circuits 48 and 50 due to a series of shift clock pulses being applied from register clock circuit 78. The register contents then pass through a full adder circuit 58. As the least significant digit (i.e. the least significant 4 bits) of register 34 are passing through full adder 58, one is added to the least significant digit by means of signal D1t1. It will be apparent from the waveform diagrams in FIG. 5 and FIG. 7 that signal D1t1 is generated periodically once per second. The contents of register 34 then pass through C register 60 and are then applied to the second full adder circuit 62. As each of the four binary coded decimal bits of each digit of the register contents appears at the output terminals of C register 60, the condition of the digit is examined by means of digit processing circuit 66 while at the same time the digit information is applied to decoder circuit 68. Digit processing circuit 66 detects if a carry operation is necessary. This is the case, for example, when the units of seconds digit exceeds a value of 9, or when the tens of seconds digit exceeds a value of 6. If such a condition is detected, then output signals from digit processing circuit 66 cause the next most significant digit to be incremented by one, by means of an input to full adder 62 at the time that digit is applied to full adder 62. The digit from which carry has occurred is reset to zero by a signal applied to 0,1 setting circuit 64 at the time when that digit is input to 0,1 setting circuit 64. Upon output from 0,1 setting circuit 64, the time information is sent back into shift register 34, and stored therein until the next word timing circulation occurs, 1 second later. Thus, during word cycle timing T1 a circulation loop is formed consisting of hours, minutes, seconds shift register 34, selector circuit 48 and 50, and calculation circuit 56.

During word cycle timing T2, the years, months and days data are circulated. During T2, control signals applied to selector circuits 48 and 50 allow the contents of years, months, days register 36 to pass to full adder 58 due to the action of a series of shift clock pulses applied to shift register 36 from register clock circuit 78. If a change from PM to AM has been detected during the previous T1 cycle, then one is added to the least significant digit of the contents of years, months, days register 36 at timing D1t1, i.e. the units of days data is incremented by one. Then, each digit of years, months, days register 36 contents appear at the output of C register 60 as a set of four binary coded decimal bits and is applied to digit processing circuit 66 and decoder circuit 68. Digit carry is performed as required by means of output signals from digit processing circuit 66 applied to full adder circuit 62 and 0,1 setting circuit 64, as described previously for the hours, minutes and seconds data.

During word cycle control timing B1, data which is to be displayed is circulated through calculation circuit 56, while digit processing circuit 66 detects and suppresses unnecessary leading zeros.

During word cycle control timing B2 and B3 the contents of the register to be displayed are circulated through calculation circuit. 56 in order to have the desired information appear sequentially at the output terminals of C register 60, to be decoded into segment display signals by means of decoder 68. Two word circulation cycles are required, i.e. B2 and B3, due to the fact that each of the four bits corresponding to the digit stored in a shift register is converted into 8 bits as a display signal. Thus, twice as many bits have to be transferred from decoder 68 as are input to it.

The output display segment signals from decoder 68 are applied to parallel/serial shift register 70 for conversion into parallel form. The output from parallel/serial shift register 70 is applied to display register 90, and stored therein. Parallel outputs from display register 90 are applied to drive circuit 92, to drive the display segments of display unit 94.

The calculation mode of operation will now be described. The timing waveforms for the calculation mode are shown in FIG. 7(*b*). While a calculation is in progress i.e. during a calculation execution cycle, a signal designated as AC remains at the H logic level. If a trailing edge of the 1 Hz signal occurs while the AC signal is at the H level, then the INT signal goes to the H level upon the trailing edge of the 1 Hz signal, but does not return to the L level until the AC signal has returned to the L level. In this way, generation of the INTE signal is delayed until the completion of the calculation execution cycle. After the calculation has been completed, word cycle control signals B1, B2, and B3 are successively generated, in order to display the calculation results. Word cycle control signals T1 and T2 are successively generated on the leading edge of the INTE signal following the completion of the calculation execution cycle. Thus, the contents of the hours, minutes, seconds register 34 are circulated and updated by 1 second during T1, while the contents of the years, months, days register 36 are circulated during T2 and are updated if necessary.

To perform a calculation, required data is first input from the keyboard 73 and stored in X register 38. For the example shown in FIG. 6 this data is 99999999. An arithmetic operation key, i.e. −,×,−, + key is then depressed. The next set of data is then input to Y register 40 from the keyboard. Information on the arithmetic operation key that has been depressed is stored in calculation control circuit 74. When the 'equals' key is depressed, word cycle control signals B1, B2 and B3 are generated so that the calculation results are displayed. To perform the calculation 99999999÷1, for example, 1 is subtracted from the contents of the X register in successive word cycles, with 1 being added to the contents of the Z register each time. This operation is controlled by decision circuit 80. When decision circuit 80 detects that the contents of the X register are zero, the calculation operation is terminated. This calculation requires the greatest amount of calculation time. If the time required for the display word cycles B1, B2 and B3 are included, a total of 330 word cycles are required. For a data shift clock frequency of 16 KHz, the calculation time required is approximately 0.73 seconds. With a circuit of conventional design, in which alternate calculation and timekeeping cycles are employed, with the timekeeping data being updated every 1/256 seconds, 256 word cycles would be required in addition to the said 0.73 seconds to perform a maximum length calculation. This amounts to a total of approximately 1.9 seconds, which represents an obstacle to rapid and convenient calculation. The method of the present invention therefore provides greatly improved rapid calculation capabilities.

As stated above, if a calculation operation is in progress while a trailing edge of the 1 Hz signal occurs, then incrementing of the units of seconds time data is postponed until the calculation execution cycles has been completed. The duration of each of word cycle control signals T1 and T2 is approximately 2.2 milliseconds. Thus, timekeeping accuracy is not affected by the updating of the units of seconds data being delayed due to a calculation operation, since the total time required to complete a maximum length calculation and then to update the seconds of time data is always less than 1 seconds.

When the device is in the timekeeping mode of operation, time correction can be performed through inputting numeric data from keyboard 73, after actuating a time setting selection switch in function keys 75. The correction data as added to the contents of hours, minutes, seconds register 34 or years, months, days register 36, while the appropriate register information is circulated through calculation circuit 56, by means of signals applied from digit processing circuit 66 to full adder 62 and 0,1 setting circuit 64.

Figure 8:
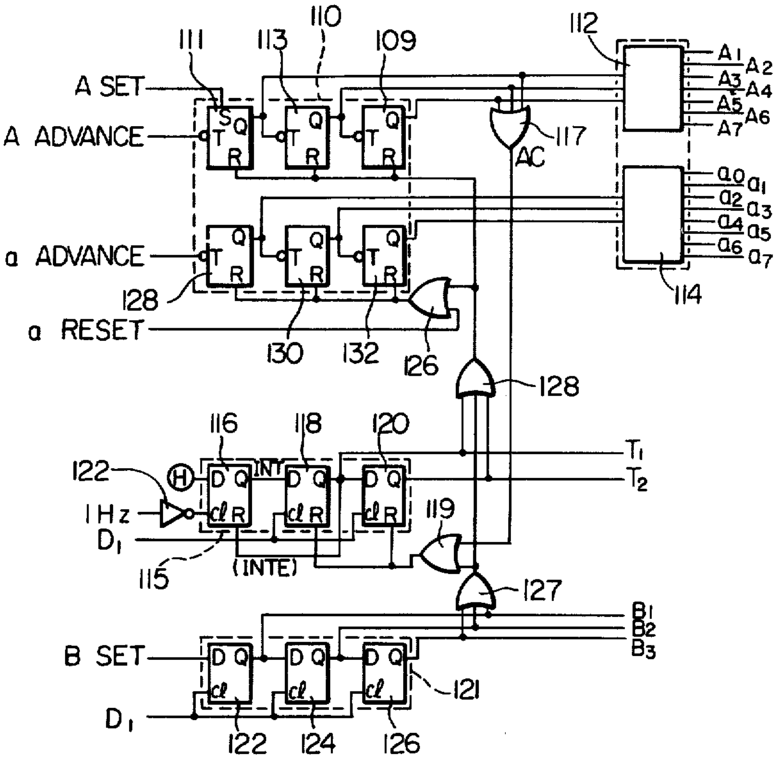
FIG. 8 is a circuit diagram illustrating an example of an address control circuit suitable for the embodiment of the present invention shown in FIG. 4.

FIG. 8 shows an example of address control circuit 76. This serves to produce various address signals required during calculation operations. These are designated as A1, A2, A3, A4, A5, A6, and A7, and a0, a1, a2, a3, a4, a5, a6 and a7. Addresses are set or reset by means of A set, A Advance, a Advance and a Reset signals produced from calculation control circuit 74, which are applied to address setting counters 61. The output signals from these counters are applied to address decoders 112, and 114 which produce address signals A1 to A7 and a0 to a7 respectively. Word cycle control signals T1 and T2 are produced by shift register 115, which is composed of data type flip-flops 116, 118 and 120. The 1 Hz signal from frequency divider 86 is applied through inverter 122 to the clock terminal of flip-flop 116, whose data terminal is held at the H level. The Q output of flip-flop 116 therefore goes to the H level upon an H level to L level transition of the 1 Hz signal. This is signal INT described previously with reference to FIG. 7. The INT signal is applied to the data terminal of flip-flop 118, to whose clock terminal digit signal D1 is applied. The Q output of flip-flop 118 is word cycle control signal T1. This is applied to the reset terminal of flip-flop 116. Thus, the INT signal returns to the L level on the leading edge of the T1 signal. The Q output of flip-flop 118 is applied to the data terminal of flip-flop 120, to whose clock terminal digit signal D1 is applied. Thus, at the next rising edge of a D1 pulse after the T1 signal has been generated, the Q output of flip-flop 120 goes to the H level. This is word cycle control signal T2. Since the data terminal of flip-flop 118 is at the L level on the rising edge of the D1 pulse which causes T2 to be produced, T1 goes to the L level when T2 begins. Upon the leading edge of the next D1 pulse after T2 has started to be produced, the Q output of flip-flop 120 returns to the L level, since at that time there is an L level input applied to its data terminal. In other words, word cycle control signal T2 is then terminated. While a calculation operation is in progress, at least one of the Q outputs of T type flip-flops 111, 113 and 115 is at the H level, so that calculation execution signal AC is output from OR gate 117. AC is applied through OR gate 117 to the reset terminal of flip-flops 118 and 120. Thus, signals T1 and T2 are inhibited so long as calculation execution is in progress. In this case, signal INT from flip-flop 116 will go to the H level on the trailing edge of the 1 Hz signal and remain there, as shown in FIG. 7(*b*), until the AC signal returns to the L level. When this occurs, the reset condition of flip-flops 118 and 120 is released, so that the T1 and T2 signals are produced and the INT signal is reset to zero by the action of T1. In this circuit example, the T1 signal performs the function of signal INTE shown in FIG. 7.

When display of data is to be performed, for example in response to actuation of the equals key at the end of a calculation, a signal Bset is produced by calculation control circuit 74. This signal is applied to data terminal of data type flip-flop 122 of shift register 121. The leading edge of the next D1 pulse causes word cycle control signal B1 to be produced from the Q output of flip-flop 122. Word cycle control signals B2 and B3 are thereafter consecutively produced. These then cause suppression of leading zeros and display of calculation results or time information to be performed, as described previously.

While register data is being circulated for timekeeping purposes or for display purposes, under the control of word cycle control signals T1, T2, or B2, B2, B3, an output signal is produced from OR gate 124 which is applied directly to the reset terminals of flip-flops 111, 113, and 115, and through OR gate 126 to the reset terminals of flip-flops 128, 130 and 132. These therefore serve to inhibit the initiation of calculation operations while a timekeeping or display data circulation is taking place.

Figure 9:
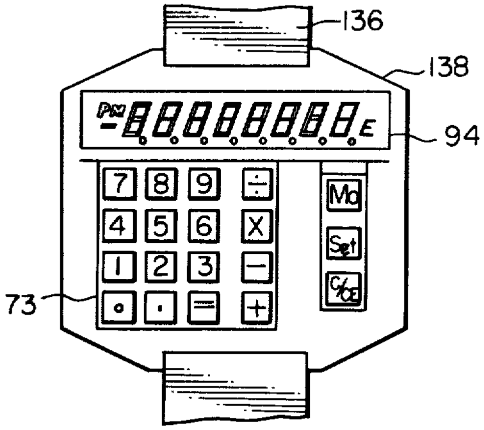
FIG. 9 is a diagram showing the general appearance of the portable electronic device in accordance with the present invention.

FIG. 9 shows an example of the external appearance of a device in accordance with the present invention. Selection of the desired mode of operation, i.e. hours, minutes, seconds display, year, month, day display or the calculation mode is selected by successive actuation of a mode switch marked Mo. Setting of time correction information can be performed by depressing the setting switch, marked Sat, then actuating appropriate numeric digit keys of keyboard 73. The other keys correspond to those of a conventional type of pocket calculator. In FIG. 9, the device is shown in the calculation mode of operation with the number −123.45670 being displayed on display unit 94. Numeral 136 indicates a wrist band while numeral 138 indicates the body of the device.

While the present invention has been shown and described with reference to the particular embodiment, it should be noted that various other changes or modifications may be made without departing from the scope of the present invention.

What is claimed is:

1. An electronic wristwatch calculator equipped with a source of standard frequency time signals, keyboard means for applying input numeric and function data signals for calculation purposes, and means for calculating and displaying time data and calculation data, comprising:

first shift register means for storing and shifting at least seconds, minutes and hours of current time data;

second shift register means for storing and shifting calculation data;

calculation control circuit means responsive to said standard frequency time signals and to said numeric and function data signals for producing a plurality of selector signals, a first plurality of control signals when a normal timekeeping mode of operation is in progress, and a second plurality of control signals when a calculation operation is in progress;

first selector circuit means responsive to said selector signals for selectively passing said current time data from said first shift register means and said calculation data from said second shift register means to an output thereof;

calculation circuit means coupled to receive said current time data and said calculation data from said output of the first selector circuit means, being responsive to said first plurality of control signals for periodically incrementing said current time data when said normal timekeeping mode of operation is in progress and responsive to said second plurality of control signals for performing a calculation operation on said calculation data when a calculation operation is in progress, and further responsive to the termination of said second plurality of control signals for incrementing said current time data upon the completion of a calculation operation if said calculation operation overlaps in time a point at which said periodic incrementing of said current time data would normally occur; and second selector means responsive to said selector signals for selectively passing said current time data and said calculation data from an output of said calculation circuit means to said first shift register means and said second shift register means.

2. An electronic wristwatch calculator according to claim 1, in which said first shift register means comprises at least a first group of register locations to store said seconds, a second group of register locations to store said minutes, a third group of register locations to store said hours, and fourth and fifth register locations arranged between said first and second groups and between said second and third groups, respectively, said fourth and fifth register locations being filled with 1 level bits representing a delimiting symbol.

3. An electronic wristwatch calculator according to claim 1, and further comprising register clock circuit means responsive to said first and second control signals from said calculation control circuit means and to said standard frequency timing signals for producing groups of shift clock pulses to be applied to said first and second shift register means, for thereby selectively shifting said calculation data and current time data held therein.

4. An electronic wristwatch calculator, comprising:

an oscillator circuit for producing a standard frequency signal;

timing generator circuit means for producing a plurality of timing signals in response to said standard frequency signal;

a keyboard having numeric keys and function keys, for applying input numeric and function data;

calculation control circuit means responsive to selected ones of said timing signals and to said numeric and function information for providing a plurality of selector signals and control signals;

register clock circuit means responsive to selected ones of said control signals and said timing signals for producing shift clock signals;

first shift register means for storing hours, minutes and seconds of current time information in static form, and for shifting said stored information in response to selected ones of said shift clock signals; second shift register means for storing years, months and days information in static form, and for shifting said stored information in response to selected ones of said shift clock signals;

third, fourth and fifth shift register means for storing calculation data in static form, with each of said third, fourth and fifth shift register means being responsive to selected ones of said shift clock signals for shifting said stored calculation data;

first selector circuit means coupled to receive the contents of said first, second, third, fourth and fifth shift register means, and responsive to said selector signals for selectively passing the contents of a pair of said shift registers to an output thereof;

second selector circuit means coupled to receive the contents of said selected pair of shift registers from said first selector circuit, and to receive selected ones of said timing signals, being responsive to said selector signals for selectively passing said shift register contents and said timing signals to a pair of outputs thereof;

calculation circuit means coupled to said outputs of the second selector circuit and responsive to said control signals for periodically incrementing said time information by adding a selected one of said timing signals to said current time information during a time display mode of operation, and responsive to said control signals for performing calculation operations upon said calculation data during calculation mode of operation, and for incrementing said current time information at points in time other than when a calculation operation is in progress;

third selector circuit means coupled to receive said time information and calculation data output from said calculation circuit means and responsive to said selector signals for selectively passing said time information and calculation data to inputs of said first, second, third, fourth and fifth shift registers respectively;

decoder circuit means coupled to said calculation circuit means, for decoding said current time information, date information, and calculation information into display segment form;

display register means coupled to receive said current time information, date information and calculation information, sand store said information in static form; and opto-electric driver and display means for displaying said current time information, date information and calculation information.

* * * * *